United States Patent
Hughes

(10) Patent No.: US 10,848,268 B2
(45) Date of Patent: *Nov. 24, 2020

(54) FORWARD PACKET RECOVERY WITH CONSTRAINED NETWORK OVERHEAD

(71) Applicant: Silver Peak Systems, Inc., Santa Clara, CA (US)

(72) Inventor: David Anthony Hughes, Los Altos Hills, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,467

(22) Filed: Apr. 26, 2019

(65) Prior Publication Data
US 2019/0253187 A1 Aug. 15, 2019

Related U.S. Application Data

(60) Continuation of application No. 15/918,807, filed on Mar. 12, 2018, now Pat. No. 10,326,551, which is a
(Continued)

(51) Int. Cl.
*H04L 1/18* (2006.01)
*H04L 1/00* (2006.01)
*H04L 29/06* (2006.01)

(52) U.S. Cl.
CPC .......... *H04L 1/0041* (2013.01); *H04L 1/0007* (2013.01); *H04L 1/0083* (2013.01);
(Continued)

(58) Field of Classification Search
CPC ... H04L 1/0007; H04L 1/0083; H04L 1/0086; H04L 1/0041
See application file for complete search history.

(56) References Cited

U.S. PATENT DOCUMENTS

| 4,494,108 A | 1/1985 | Langdon, Jr. et al. |
| 4,558,302 A | 12/1985 | Welch |

(Continued)

FOREIGN PATENT DOCUMENTS

| EP | 1507353 A2 | 2/2005 |
| JP | H05061964 A | 3/1993 |
| WO | WO0135226 A1 | 5/2001 |

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14 pages.
(Continued)

*Primary Examiner* — Esaw T Abraham
(74) *Attorney, Agent, or Firm* — Carr & Ferrell LLP

(57) ABSTRACT

Disclosed herein are systems and methods for forward packet recovery in a communication network with constrained network bandwidth overhead. In exemplary embodiments, a target byte protection ratio is determined. Error correcting frames are dynamically generated by a first processor such that error correcting information can be generated to approximate the target byte protection ratio. The data packets and error correcting information are then transmitted across one or more communication networks to a second processor. The second processor can use the error correcting information to regenerate or replace data packets missing or corrupted in transmission across one or more communication networks.

20 Claims, 11 Drawing Sheets

Related U.S. Application Data division of application No. 15/241,992, filed on Aug. 19, 2016, now Pat. No. 9,967,056.

(52) U.S. Cl.
CPC ............ *H04L 1/0086* (2013.01); *H04L 69/22* (2013.01); *H04L 1/0057* (2013.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Williams et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 * | 11/2004 | Smith ...................... H04J 3/14 714/18 |
| 6,839,346 B1 | 1/2005 | Kametani |
| 6,842,424 B1 | 1/2005 | Key |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van Bokkelen et al. |
| 7,243,094 B2 | 7/2007 | Tabellion et al. |
| 7,249,309 B2 * | 7/2007 | Glaise ................. H03M 5/145 714/781 |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 * | 10/2008 | Bhardwaj ............. H04L 12/437 709/230 |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |
| 7,532,134 B2 | 5/2009 | Samuels et al. |
| 7,555,484 B2 | 6/2009 | Kulkarni et al. |
| 7,571,343 B2 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |

(56) References Cited

U.S. PATENT DOCUMENTS

| | | | |
|---|---|---|---|
| 7,793,193 B2 * | 9/2010 | Koch | H04L 1/0057 714/758 |
| 7,810,155 B1 | 10/2010 | Ravi | |
| 7,826,798 B2 | 11/2010 | Stephens et al. | |
| 7,827,237 B2 | 11/2010 | Plamondon | |
| 7,849,134 B2 | 12/2010 | McCanne et al. | |
| 7,853,699 B2 | 12/2010 | Wu et al. | |
| 7,873,786 B1 | 1/2011 | Singh et al. | |
| 7,917,599 B1 | 3/2011 | Gopalan et al. | |
| 7,924,795 B2 * | 4/2011 | Wan | H04W 72/1215 370/338 |
| 7,925,711 B1 | 4/2011 | Gopalan et al. | |
| 7,941,606 B1 | 5/2011 | Pullela et al. | |
| 7,945,736 B2 | 5/2011 | Hughes et al. | |
| 7,948,921 B1 | 5/2011 | Hughes et al. | |
| 7,953,869 B2 | 5/2011 | Demmer et al. | |
| 7,957,307 B2 | 6/2011 | Qiu et al. | |
| 7,970,898 B2 | 6/2011 | Clubb et al. | |
| 7,975,018 B2 | 7/2011 | Unrau et al. | |
| 7,996,747 B2 * | 8/2011 | Dell | H03M 13/03 714/776 |
| 8,046,667 B2 * | 10/2011 | Boyce | H03M 13/373 370/456 |
| 8,069,225 B2 | 11/2011 | McCanne | |
| 8,072,985 B2 | 12/2011 | Golan et al. | |
| 8,090,027 B2 | 1/2012 | Schneider | |
| 8,090,805 B1 | 1/2012 | Chawla et al. | |
| 8,095,774 B1 | 1/2012 | Hughes et al. | |
| 8,140,757 B1 | 3/2012 | Singh | |
| 8,171,238 B1 | 5/2012 | Hughes et al. | |
| 8,209,334 B1 | 6/2012 | Doerner | |
| 8,225,072 B2 | 7/2012 | Hughes et al. | |
| 8,271,325 B2 | 9/2012 | Silverman et al. | |
| 8,271,847 B2 | 9/2012 | Langner | |
| 8,307,115 B1 | 11/2012 | Hughes | |
| 8,312,226 B2 | 11/2012 | Hughes | |
| 8,352,608 B1 | 1/2013 | Keagy et al. | |
| 8,370,583 B2 | 2/2013 | Hughes | |
| 8,386,797 B1 | 2/2013 | Danilak | |
| 8,392,684 B2 | 3/2013 | Hughes | |
| 8,442,052 B1 | 5/2013 | Hughes | |
| 8,447,740 B1 | 5/2013 | Huang et al. | |
| 8,473,714 B2 | 6/2013 | Hughes et al. | |
| 8,489,562 B1 | 7/2013 | Hughes et al. | |
| 8,516,158 B1 | 8/2013 | Wu et al. | |
| 8,553,757 B2 | 10/2013 | Florencio et al. | |
| 8,565,118 B2 | 10/2013 | Shukla et al. | |
| 8,570,869 B2 * | 10/2013 | Ojala | H04L 1/008 370/235 |
| 8,576,816 B2 | 11/2013 | Lamy-Bergot et al. | |
| 8,595,314 B1 | 11/2013 | Hughes | |
| 8,613,071 B2 | 12/2013 | Day et al. | |
| 8,681,614 B1 | 3/2014 | McCanne et al. | |
| 8,699,490 B2 | 4/2014 | Zheng et al. | |
| 8,700,771 B1 | 4/2014 | Ramankutty et al. | |
| 8,706,947 B1 | 4/2014 | Vincent | |
| 8,725,988 B2 | 5/2014 | Hughes et al. | |
| 8,732,423 B1 | 5/2014 | Hughes | |
| 8,738,865 B1 | 5/2014 | Hughes et al. | |
| 8,743,683 B1 | 6/2014 | Hughes | |
| 8,755,381 B2 | 6/2014 | Hughes et al. | |
| 8,775,413 B2 | 7/2014 | Brown et al. | |
| 8,811,431 B2 | 8/2014 | Hughes | |
| 8,843,627 B1 | 9/2014 | Baldi et al. | |
| 8,850,324 B2 | 9/2014 | Clemm et al. | |
| 8,885,632 B2 | 11/2014 | Hughes et al. | |
| 8,891,554 B2 | 11/2014 | Biehler | |
| 8,929,380 B1 | 1/2015 | Hughes et al. | |
| 8,929,402 B1 | 1/2015 | Hughes | |
| 8,930,650 B1 | 1/2015 | Hughes et al. | |
| 9,003,541 B1 | 4/2015 | Patidar | |
| 9,036,662 B1 | 5/2015 | Hughes | |
| 9,054,876 B1 | 6/2015 | Yagnik | |
| 9,092,342 B2 | 7/2015 | Hughes et al. | |
| 9,106,530 B1 | 8/2015 | Wang | |
| 9,130,991 B2 | 9/2015 | Hughes | |
| 9,131,510 B2 | 9/2015 | Wang | |
| 9,143,455 B1 | 9/2015 | Hughes | |
| 9,152,574 B2 | 10/2015 | Hughes et al. | |
| 9,171,251 B2 | 10/2015 | Camp et al. | |
| 9,191,342 B2 | 11/2015 | Hughes et al. | |
| 9,202,304 B1 | 12/2015 | Baenziger et al. | |
| 9,253,277 B2 | 2/2016 | Hughes et al. | |
| 9,306,818 B2 | 4/2016 | Aumann et al. | |
| 9,307,442 B2 | 4/2016 | Bachmann et al. | |
| 9,363,248 B1 | 6/2016 | Hughes | |
| 9,363,309 B2 | 6/2016 | Hughes | |
| 9,380,094 B2 | 6/2016 | Florencio et al. | |
| 9,397,951 B1 | 7/2016 | Hughes | |
| 9,438,538 B2 | 9/2016 | Hughes et al. | |
| 9,549,048 B1 | 1/2017 | Hughes | |
| 9,584,403 B2 | 2/2017 | Hughes et al. | |
| 9,584,414 B2 | 2/2017 | Sung et al. | |
| 9,613,071 B1 | 4/2017 | Hughes | |
| 9,626,224 B2 | 4/2017 | Hughes et al. | |
| 9,647,949 B2 | 5/2017 | Varki et al. | |
| 9,712,463 B1 | 7/2017 | Hughes et al. | |
| 9,716,644 B2 | 7/2017 | Wei et al. | |
| 9,717,021 B2 | 7/2017 | Hughes et al. | |
| 9,875,344 B1 | 1/2018 | Hughes et al. | |
| 9,906,630 B2 | 2/2018 | Hughes | |
| 9,948,496 B1 | 4/2018 | Hughes et al. | |
| 9,961,010 B2 | 5/2018 | Hughes et al. | |
| 9,967,056 B1 | 5/2018 | Hughes | |
| 10,091,172 B1 | 10/2018 | Hughes | |
| 10,164,861 B2 | 12/2018 | Hughes et al. | |
| 10,257,082 B2 | 4/2019 | Hughes | |
| 10,313,930 B2 | 6/2019 | Hughes et al. | |
| 10,326,551 B2 | 6/2019 | Hughes | |
| 10,432,484 B2 | 10/2019 | Hughes et al. | |
| 10,637,721 B2 | 4/2020 | Hughes et al. | |
| 10,719,588 B2 | 7/2020 | Hughes et al. | |
| 10,771,370 B2 | 9/2020 | Hughes et al. | |
| 10,771,394 B2 | 9/2020 | Hughes | |
| 2001/0026231 A1 | 10/2001 | Satoh | |
| 2001/0054084 A1 | 12/2001 | Kosmynin | |
| 2002/0007413 A1 | 1/2002 | Garcia-Luna-Aceves et al. | |
| 2002/0009079 A1 | 1/2002 | Jungck et al. | |
| 2002/0010702 A1 | 1/2002 | Ajtai et al. | |
| 2002/0010765 A1 | 1/2002 | Border | |
| 2002/0040475 A1 | 4/2002 | Yap et al. | |
| 2002/0061027 A1 | 5/2002 | Abiru et al. | |
| 2002/0065998 A1 | 5/2002 | Buckland | |
| 2002/0071436 A1 | 6/2002 | Border et al. | |
| 2002/0078242 A1 | 6/2002 | Viswanath | |
| 2002/0101822 A1 | 8/2002 | Ayyagari et al. | |
| 2002/0107988 A1 | 8/2002 | Jordan | |
| 2002/0116424 A1 | 8/2002 | Radermacher et al. | |
| 2002/0129158 A1 | 9/2002 | Zhang et al. | |
| 2002/0129260 A1 | 9/2002 | Benfield et al. | |
| 2002/0131434 A1 | 9/2002 | Vukovic et al. | |
| 2002/0150041 A1 | 10/2002 | Reinshmidt et al. | |
| 2002/0159454 A1 | 10/2002 | Delmas | |
| 2002/0163911 A1 | 11/2002 | Wee et al. | |
| 2002/0169818 A1 | 11/2002 | Stewart et al. | |
| 2002/0181494 A1 | 12/2002 | Rhee | |
| 2002/0188871 A1 | 12/2002 | Noehring et al. | |
| 2002/0194324 A1 | 12/2002 | Guha | |
| 2003/0002664 A1 | 1/2003 | Anand | |
| 2003/0009558 A1 | 1/2003 | Ben-Yehezkel | |
| 2003/0012400 A1 | 1/2003 | McAuliffe et al. | |
| 2003/0033307 A1 | 2/2003 | Davis et al. | |
| 2003/0046572 A1 | 3/2003 | Newman et al. | |
| 2003/0048750 A1 | 3/2003 | Kobayashi | |
| 2003/0048785 A1 | 3/2003 | Calvignac et al. | |
| 2003/0067940 A1 | 4/2003 | Edholm | |
| 2003/0123481 A1 | 7/2003 | Neale et al. | |
| 2003/0123671 A1 | 7/2003 | He et al. | |
| 2003/0131079 A1 | 7/2003 | Neale et al. | |
| 2003/0133568 A1 | 7/2003 | Stein et al. | |
| 2003/0142658 A1 | 7/2003 | Ofuji et al. | |
| 2003/0149661 A1 | 8/2003 | Mitchell et al. | |
| 2003/0149869 A1 | 8/2003 | Gleichauf | |

(56) References Cited

U.S. PATENT DOCUMENTS

| | | |
|---|---|---|
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dellinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | DuRee |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1* | 5/2006 | Malamal Vadakital ............ H04L 65/607 370/299 |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1* | 4/2007 | Kolakowski .......... H04L 1/0041 370/389 |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0160200 A1 | 7/2007 | Ishikawa et al. |
| 2007/0174428 A1 | 7/2007 | Lev Ran et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar |
| 2009/0175172 A1 | 7/2009 | Prytz et al. |
| 2009/0182864 A1 | 7/2009 | Khan et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |

(56) References Cited

U.S. PATENT DOCUMENTS

| | | |
|---|---|---|
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van Der Linden et al. |
| 2011/0113472 A1 | 5/2011 | Fung et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Dvsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez Fuentes et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | van Der Linden et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | DeCusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le Scouamec et al. |
| 2015/0127701 A1 | 5/2015 | Chu et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1 | 4/2016 | Li |
| 2016/0142310 A1 | 5/2016 | Means |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |
| 2020/0279029 A1 | 9/2020 | Hughes et al. |

OTHER PUBLICATIONS

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, <http://www.lancache.com/slcdata.htm>, 8 pages.

Spring et al., "A protocol-independent technique for eliminating redundant network traffic", ACM SIGCOMM computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE, pp. 101-114.

You, L. L. and Karamanolis, C. 2004. "Evaluation of efficient archival storage techniques", In Proceedings of the 21st IEEE Symposium on Mass Storage Systems and Technologies (MSST), pp. 1-6.

Douglis, F. et al., "Application specific Delta-encoding via Resemblance Detection", Published in the 2003 USENIX Annual Technical Conference, pp. 1-14.

You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.

Manber, Udi, "Finding Similar Files in a Large File System", TR 93-33 Oct. 1994, Department of Computer Science, University of

(56) References Cited

OTHER PUBLICATIONS

Arizona. <http://webglimpse.net/pubs/TR93-33.pdf>. Also appears in the 1994 winter USENIX Technical Conference, pp. 1-10.

Knutsson, Bjorn et al., "Transparent Proxy Signalling", Journal of Communications and Networks, vol. 3, No. 2, Jun. 2001, pp. 164-174.

Definition memory (n), Webster's Third New International Dictionary, Unabridged (1993), available at <http://lionreference.chadwyck.com> (Dictionaries/Webster's Dictionary). Copy not provided in IPR2013-00402 proceedings.

Definition appliance, 2c, Webster's Third New International Dictionary, Unabridged (1993), available at <http://lionreference.chadwyck.com> (Dictionaries/Websters Dictionary). Copy not provided in IPR2013-00402 proceedings.

Newton, "Newton's Telecom Dictionary", 17th Ed., 2001, pp. 38, 201, and 714.

Silver Peak Systems, "The Benefits of Byte-level WAN Deduplication" (2008), pp. 1-4.

Business Wire, "Silver Peak Systems Delivers Family of Appliances for Enterprise-Wide Centralization of Branch Office Infrastructure; Innovative Local Instance Networking Approach Overcomes Traditional Application Acceleration Pitfalls" (available at http://www.businesswire.com/news/home/20050919005450/en/Silver-Peak-Systems-Delivers-Family-Appliances-Enterprise-Wide#.UVzkPk7u-1 (last visited Aug. 8, 2014)), 4 pages.

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)), 4 pages.

Tseng, Josh, "When accelerating secure traffic is not secure" (available at http://www.riverbed.com/blogs/whenaccelerati.html?&isSearch=true&pageSize=38&page=2 (last visited Aug. 8, 2014)), 3 pages.

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.

Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)), 2 pages.

Final Written Decision, dated Dec. 30, 2014, Inter Partes Review Case No. IPR2013-00403, pp. 1-38.

Final Written Decision, dated Dec. 30, 2014, Inter Partes Review Case No. IPR2013-00402, pp. 1-37.

"Notice of Entry of Judgement Accompanied by Opinion", United States Court of Appeals for the Federal Circuit, Case: 15-2072, Oct. 24, 2017, 6 pages.

"Decision Granting Motion to Terminate", Inter Partes Review Case No. IPR2014-00245, Feb. 7, 2018, 4 pages.

* cited by examiner

FORWARD PACKET RECOVERY WITH CONSTRAINED NETWORK OVERHEAD

CROSS-REFERENCE TO RELATED APPLICATIONS

The present patent application is a Continuation of, and claims the priority benefit of, U.S. patent application Ser. No. 15/918,807 filed on Mar. 12, 2018 and entitled "Forward Packet Recovery with Constrained Network Overhead", now granted as U.S. Pat. No. 10,326,551 issued on Jun. 18, 2019, which in turn is a Divisional Application of, and claims the priority benefit of, U.S. patent application Ser. No. 15/241,992 filed on Aug. 19, 2016 and entitled "Forward Packet Recovery with Constrained Overhead", now granted as U.S. Pat. No. 9,967,056 issued on May 8, 2018. The disclosures of the above-referenced applications are hereby incorporated by reference in their entirety for all purposes.

TECHNICAL FIELD

This disclosure relates generally to network communications and more specifically to forward packet recovery.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Typically, data is sent between computing devices across a communications network in packets. The packets may be generated according to a variety of protocols such as Transmission Control Protocol (TCP), User Datagram Protocol (UDP), or the like. During transmission, packets may be lost, corrupted, or received out of order. In these instances, the computing device sending the packets may have to resend the packets or the receiving application may have methods for coping with missing or corrupted packets. Either way the impairments are undesirable.

Forward packet recovery methods provide for generating and transmitting additional parity packets across a communications network. The parity packet contains information that can be used to reconstruct or replace one or more corrupted or lost packets at the receiver side. Parity packets are traditionally sent in a ratio based on a number of data packets transmitted. For example, one parity packet may be sent per five data packets. However, since the number and amount of parity information is based on a number of data packets transmitted, the amount of network bandwidth needed for transmission of these packets is unpredictable, at least because data packets can be of varying sizes.

Thus, there is a need for a mechanism for transmitting error correcting information to repair or replace data based on a number of bytes transmitted, rather than based on a number of packets transmitted across one or more communication networks, to accommodate for constrained network resources.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In various exemplary methods of the present disclosure, a first processor receives a data stream comprising a plurality of data packets for transmission across at least one communication network, selects a target byte protection ratio for the data transmission, the target byte protection ratio representing a target number of bytes of error correcting information per bytes of data in the data stream, dynamically generates one or more error correcting frames for the data stream, generates one or more error correction data packets for each error correcting frame of data in accordance with the target byte protection ratio, and transmits the plurality of data packets and the one or more error correction data packets across the at least one communication network to a second processor.

The error correcting frames can be dynamically generated by grouping data packets of the data stream in various configurations, fragmenting data packets, and/or segmenting data packets. By adjusting the error correcting frames in this way, the amount of error correcting information generated in accordance with the target byte protection ratio is reduced in comparison to a target packet protection ratio. Further, error correction information is generated in accordance with constrained network overhead resource requirements.

Other features, examples, and embodiments are described below.

BRIEF DESCRIPTION OF THE DRAWINGS

Embodiments are illustrated by way of example and not by limitation in the figures of the accompanying drawings, in which like references indicate similar elements.

FIG. 7 depicts an exemplary embodiment of dynamic framing via splitting data packets.

FIG. 9A depicts another exemplary embodiment of generating byte based error correction information for a plurality of data packets using a data structure.

FIG. 9B depicts a further exemplary embodiment of generating byte based error correction information for a plurality of data packets using a data structure.

DETAILED DESCRIPTION

Figure 1:
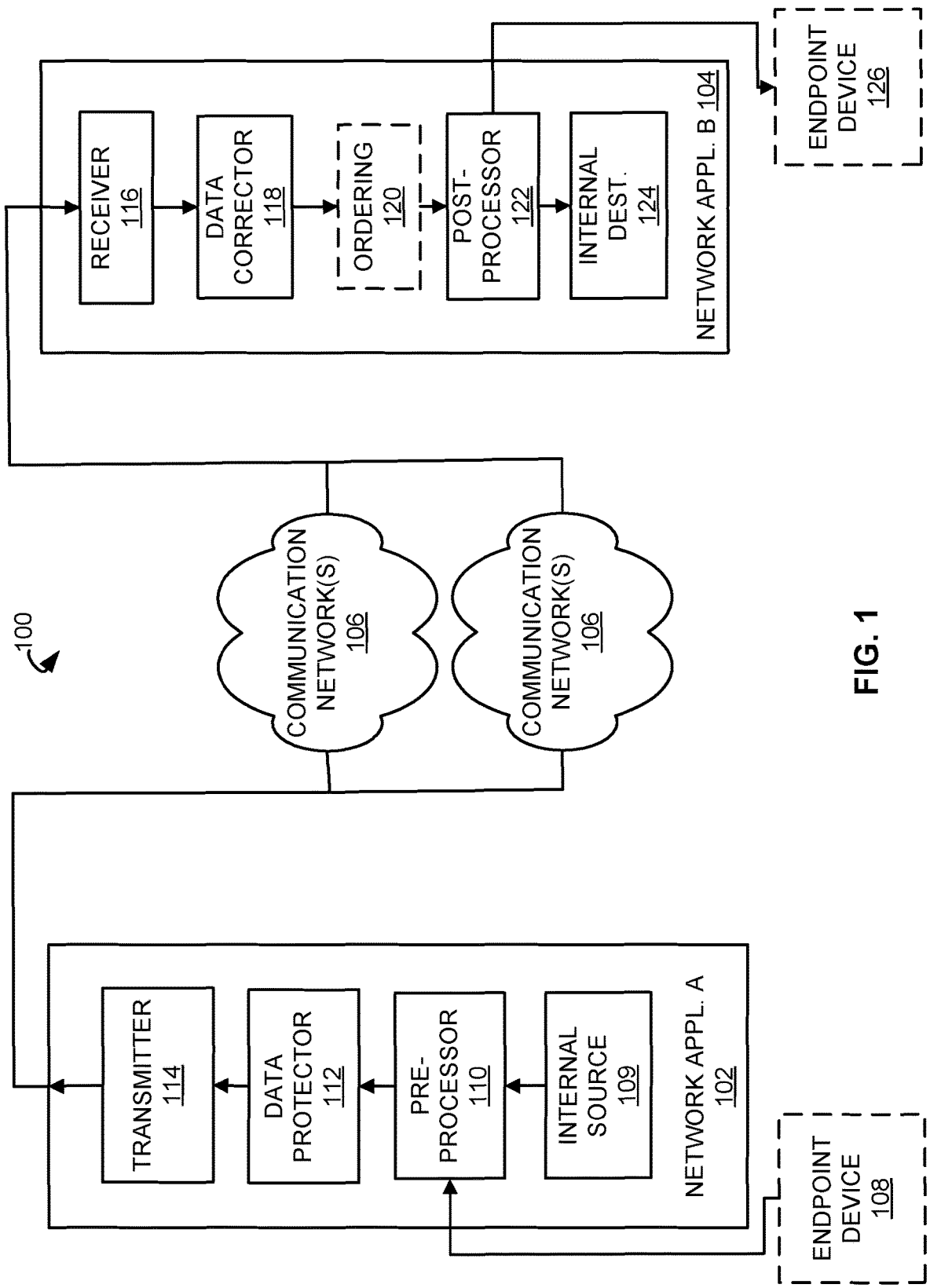
FIG. 1 is a diagram of an exemplary environment in which various embodiments of the present disclosure may be practiced.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to forward packet recovery for data transmitted across one or more communication networks.

Exemplary systems and methods for forward packet recovery are provided. Forward packet recovery can be used to reconstruct missing data packets and corrupted data packets and order the received and reconstructed data packets prior to processing according to a protocol such as Transmission Control Protocol (TCP), User Datagram Protocol (UDP), or the like. In order to perform forward packet recovery, protection packets with error correcting information are sent with the data packets. Protection packets are also sometimes referred to herein as correction packets, error correction packets, error correction data packets or protection data packets. Typically, one protection packet can be used to reconstruct one missing or corrupted data packet. However, sending the protection packets in addition to the data packets uses more bandwidth in a communication network which may, in turn, slow communications between network appliances. However, not sending a sufficient number of protection packets may result in having to resend data packets. Missing data packets and out of order packets can negatively impact performance of TCP and other high level protocols.

Protection packets can be sent based on data packets in an error correcting frame of a stream of data. As used herein, a stream of data can be any sequence of data packets transmitted between two devices. A stream may be the same as a flow, as understood by persons of ordinary skill in the art, or may be different than a flow. A stream can be comprised of an aggregate of multiple flows or sessions. The stream may contain packets using TCP, UDP, and/or other protocols. In some implementations separate streams may be created for different quality of service classes or types of traffic.

FIG. 1 is a diagram of an environment 100 in which various embodiments of the present disclosure may be practiced. The environment 100 comprises a network appliance A 102 and a network appliance B 104 communicatively coupled via one or more communication network(s) 106.

While two network appliances are depicted in FIG. 1 for exemplary purposes, there can be any number of network appliances communicatively coupled to one or more other network appliances.

In a wide area network, there can be multiple network appliances deployed in one or more geographic locations. Each network appliance comprises hardware and/or software elements configured to receive data and optionally perform any type of processing, including but not limited to, WAN optimization techniques to the data, before transmitting to another appliance or an endpoint device. In various embodiments, a network appliance can be configured as an additional router or gateway. If a network appliance has multiple interfaces, it can be transparent on some interfaces, act like a router on some interfaces, or be a bridge on others. Alternatively, the network appliance can be transparent on all interfaces, or appear as a router, or appear as a bridge on all interfaces. In some embodiments, network traffic can be intercepted by another device and mirrored (copied) onto a network appliance. Each network appliance may further be either physical or virtual. For example, a virtual network appliance can be in a private data center or virtual private cloud (not shown), managed by a cloud service provider, such as Amazon Web Services, or others.

The communication network(s) 106 may comprise a Wide Area Network (WAN), the Internet, MPLS (Multiprotocol Label Switching), LTE (Long Term Evolution), or any other wired or wireless network, as will be apparent to those skilled in the art. The network appliance A 102 and the network appliance B 104 may be communicatively coupled via one or more communication network(s) 106, including any combination of WAN, Internet, MPLS, or LTE. In various embodiments, network appliance A 102 and network appliance B 104 communicate via at least two communication networks.

In various embodiments, network appliance A 102 and network appliance B 104 are optionally in communication with endpoint devices 108 and 126, respectively. The network appliances can be optionally in communication with the endpoint devices either directly or through other intermediate devices such as switches and routers (not shown). Endpoint devices 108 and 126 may each comprise a computer, a server, a mobile device, or the like as will be apparent to those skilled in the art. Endpoint devices 108 and 126 may or may not be communicatively coupled directly to one or more communication network(s) 106 in addition to, or instead of, through a network appliance.

In the exemplary depiction in FIG. 1, network appliance A 102 is configured to send data packets to network appliance B 104 via one or more communication network(s) 106. Network appliance B 104 is configured to receive data packets from network appliance A 102. In other embodiments, network appliance B 104 may transmit data and network appliance A 102 may receive data. Each network appliance can comprise a computer, a server, a router, or the like. A network appliance is described further herein with respect to FIG. 2.

The network appliance A 102 comprises sub-systems that perform certain functions. In various embodiments, network appliance A 102 comprises at least an internal source 109, a pre-processor 110, data protector 112, and a transmitter 114. Certain functions of one or more sub-systems may be combined, or performed by additional sub-systems.

In an exemplary embodiment, network appliance A 102 has data to be transmitted across one or more communication network(s) 106 to network appliance B 104 or to endpoint device 126 in communication with network appliance B 104. The data for transmission may be received by network appliance A 102 from endpoint device 108, or may be generated by internal source 109 of network appliance A 102 itself.

In various embodiments, pre-processor 110 is a hardware and/or software component of network appliance A 102. The pre-processor 110 may receive data for transmission from endpoint device 108, receive data internally generated from another sub-system of network appliance A 102, or generate the data itself. Pre-processor 110 may also optionally perform other operations on the data, such as formatting, encapsulating, coalescing, or optimizing. Optimization techniques performed to the data can include such items as compression, encryption, and adding tunnel headers. While only a few examples are listed here, a person of ordinary skill in the art would understand that pre-processor 110 can perform any data optimization technique on the data.

Data protector 112 is a hardware and/or software component of network appliance A 102. In various embodiments, data protector 112 is configured to generate protection packets based on data packets received from the pre-processor 110 and a protection ratio. Protection may be used by, for example, the network appliance B 104 to reconstruct data packets that are corrupted or missing. A packet protection ratio indicates the number of protection packets per the number of data packets, and a byte protection ratio indicates the number of correction bytes per the number of data bytes in the data frame (also referred to herein as error correcting frame, or simply frame).

In some systems, one or more protection packets are sent with each frame. The protection packet may be a byte-wise exclusive-or (XOR) of all of the data packets in the frame. As is known to those skilled in the art, any single missing or corrupted data packet can be recovered using an XOR operation. Although the XOR operation is discussed, there are many ways one or more missing or corrupted data packets can be recovered, depending on the protection algorithm. The error correction packet is often referred to as a parity packet. While XOR is often used to generate parity packets, there are other methods for generating other types of protection packets (also sometimes referred to herein as protection data or protection information) which may use other operations.

In various embodiments, data protector 112 is configured to generate more than one protection packet per a defined number of data packets. For example, the packet protection ratio may be 8:40 indicating that, for a frame comprising forty data packets, eight distinct protection packets are additionally generated. This may be performed using a unique, identifiable function to generate each of the protection packets. Using a ratio of 8:40 rather than a ratio of 1:5 allows for more missing or corrupted packets that are, for example, sequential to one another, to be reconstructed and thus avoids resending multiple packets. The more than one protection packets may be generated based on algorithms using Reed-Solomon coding and finite field arithmetic, as is known to those skilled in the art, or other methods.

Further, in some embodiments, the data protector 112 is configured to change the protection ratio dynamically. This may be in response to network measurements, for example increasing the ratio when the observed loss is low and decreasing the ratio which the observed loss is high. In some circumstances the ratio will be changed when the framing algorithm "times out" because the stream has no packets to send.

Transmitter 114 is a hardware and/or software component of network appliance A 102. In various embodiments, transmitter 114 is configured to queue and transmit data packets and protection packets across one or more communication network(s) 106 to network appliance B 104. Protection packets may be transmitted substantially simultaneously as data packets, or may be sent at a delay or upon the meeting of a condition. Exemplary conditions include a frame boundary, a network condition, or a timeout parameter being met. In various embodiments, transmitter 114 can send data across multiple networks of the one or more communication network(s) 106 simultaneously, or in an alternating, interleaving or interspersed manner.

The network appliance B 104 comprises sub-systems that perform certain functions. In various embodiments, network appliance B 104 comprises at least, a receiver 116, a data corrector 118, a post-processor 122, an internal destination 124, and optionally an ordering sub-system 120. The network appliance B 104 may additionally be configured as a network appliance A 102 and may be a computer, server, router, network appliance, or the like.

Receiver 116 is a hardware and/or software component of network appliance B 104. The receiver 116 is configured to receive data packets and protection packets from the network appliance A 102 via one or more communication network(s) 106.

Data corrector 118 is a hardware and/or software component of network appliance B 104. Data corrector 118 is configured to determine if any data packets are missing, corrupted, or out of order. If any data packets are missing or corrupted, data corrector 118 is configured to determine whether the missing or corrupted packets can be reconstructed using a combination of the correctly received data packets and the received protection packets and, if the packets can be reconstructed, reconstruct the packets.

When present, the ordering sub-system 120 is configured to order the received packets, or copies of the received packets, and the reconstructed packets prior to processing by the post-processor 122. Ordering may be based on a sequence number in the header information of each packet. Ordering sub-system 120 is a hardware and/or software component of network appliance B 104. In exemplary embodiments where network appliance B 104 does not include an ordering sub-system 120, data packets may be re-ordered by endpoint device 126 or another recipient of the data. In some embodiments, the network appliance B 104 is configured to copy incoming packets, to send one copy to the data corrector 118, and send the other copy to the ordering sub-system 120.

Post-processor 122 is configured to receive data packets and reconstructed data packets from data corrector 118 and/or ordering sub-system 120, and deliver the data to endpoint device 126 or to an internal destination 124 of network appliance B 104. Post-processor 122 is a hardware and/or software component of network appliance B 104 that often performs an inverse operation to pre-processor 110 (decrypt, decompress, etc.).

Figure 2:
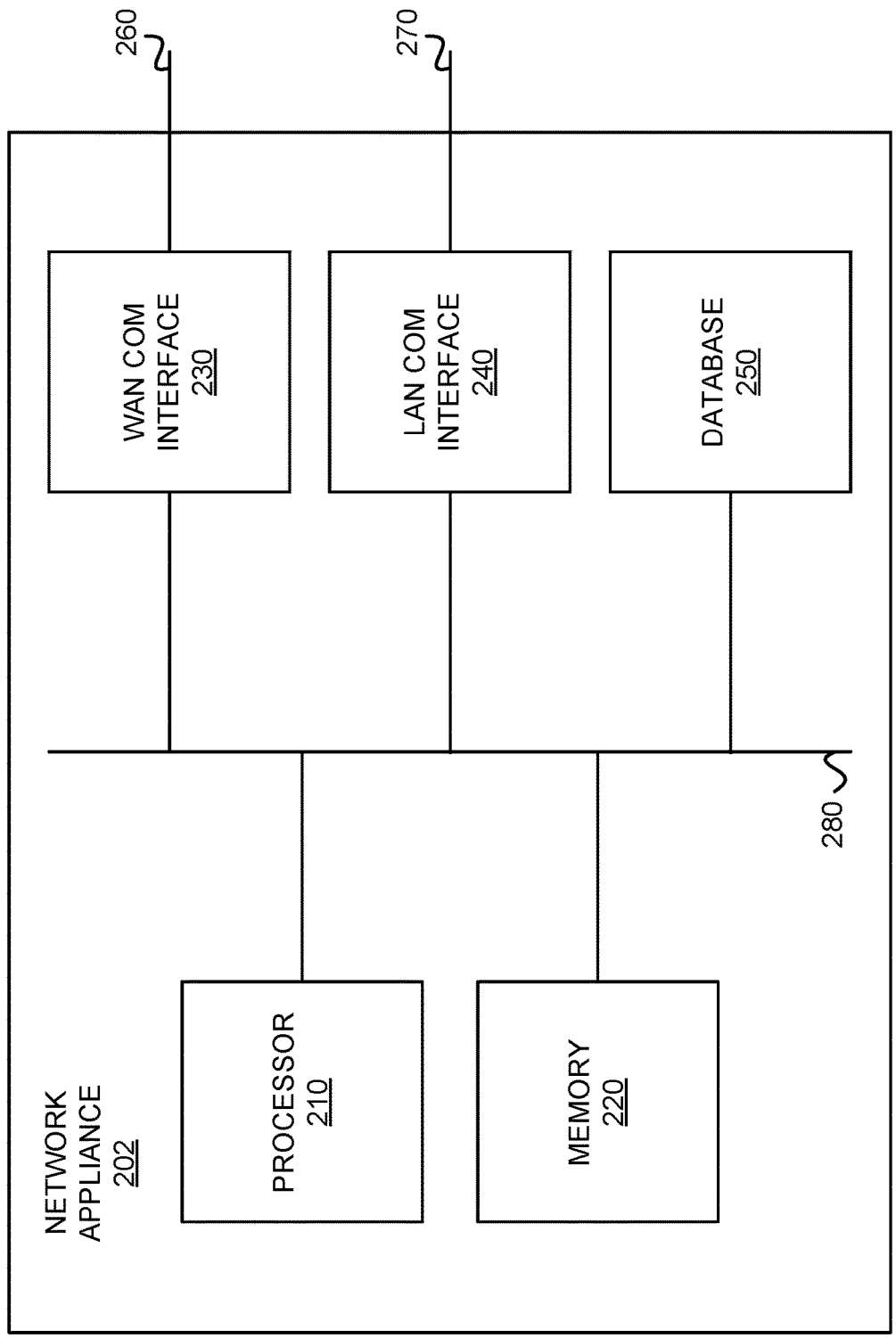
FIG. 2 is an exemplary schematic of a network appliance.

FIG. 2 illustrates a block diagram of a network appliance 202, in an exemplary implementation of the disclosure. Network appliance 202 can be configured as network appliance A 102 or network appliance B 104 of FIG. 1. The network appliance 202 includes a processor 210, a memory 220, a WAN communication interface 230, a LAN communication interface 240, and a database 250. A system bus 280 links the processor 210, the memory 220, the WAN communication interface 230, the LAN communication interface 240, and the database 250. Line 260 links the WAN communication interface 230 to another device, such as another appliance, router, or gateway, and line 270 links the LAN communication interface 240 to a user computing device, or other networking device. While network appliance 202 is depicted in FIG. 2 as having these exemplary components, the appliance may have additional or fewer components.

The database 250 comprises hardware and/or software elements configured to store data in an organized format to allow the processor 210 to create, modify, and retrieve the data. The hardware and/or software elements of the database 250 may include storage devices, such as RAM, hard drives, optical drives, flash memory, and magnetic tape.

In some embodiments, some network appliances comprise identical hardware and/or software elements. Alternatively, in other embodiments, some network appliances may include hardware and/or software elements providing additional processing, communication, and storage capacity.

Each network appliance 202 can be in communication with at least one other network appliance 202, whether in the same geographic location, different geographic location, private cloud network, customer datacenter, or any other location. As understood by persons of ordinary skill in the art, any type of network topology may be used. There can be one or more secure tunnels between one or more network appliances. The secure tunnel may be utilized with encryption (e.g., IPsec), access control lists (ACLs), compression (such as header and payload compression), fragmentation/coalescing optimizations and/or error detection and correction provided by an appliance.

A network appliance 202 can further have a software program operating in the background that tracks its activity and performance. For example, information about data streams that are processed by the network appliance 202 can be collected. Any type of information about a stream can be collected, such as header information (source port, destination port, source address, destination address, protocol, etc.), packet count, byte count, timestamp, traffic type, or any other stream attribute.

Typically in forward packet recovery, an initial packet protection ratio K:N, indicating a first number of protection packets per a second number of data packets in a frame, is determined. In embodiments of the present disclosure, a byte protection ratio can be determined, indicating a number of correction bytes per a number of data bytes in a frame. The process of determining the correction bytes may be performed by the data protector 112 in the network appliance A 102.

Figure 3:
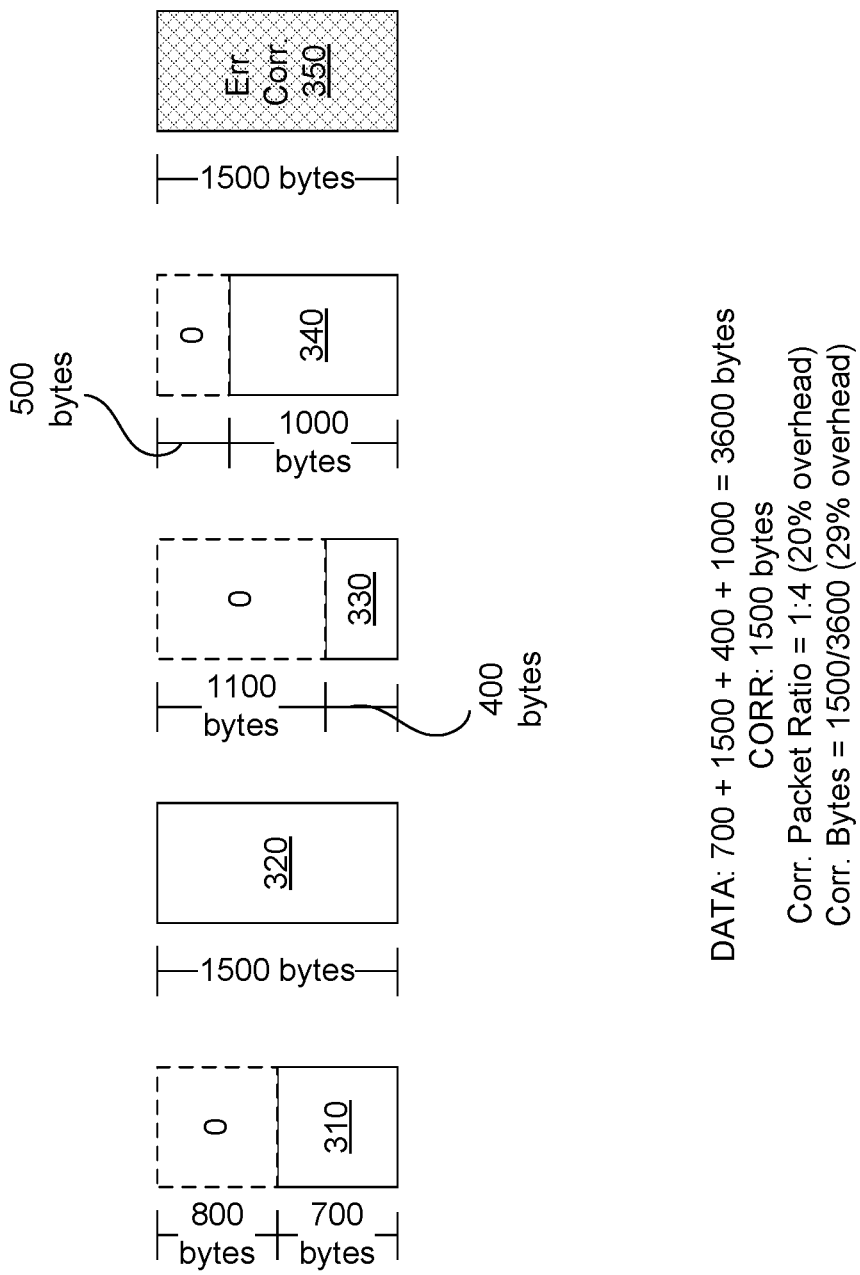
FIG. 3 depicts an exemplary error correcting frame of prior systems.

In other systems, forward packet recovery is based on data packets, regardless of the size of each packet. An error correction packet, typically a parity packet, can be generated for each frame, with the error correcting information. FIG. 3 depicts an exemplary frame of prior systems. The frame consists of data packets 310, 320, 330 and 340, and error correction packet 350. The parity packet is generated to typically be the same size as the largest data packet in the frame. A placeholder (typically zeros) is implicitly added to the other data packets in the frame to make them all effectively the size of the largest data packet, which is packet 320 in the figure. Transmitter 114 may typically transmit the data packets across communication network(s) 106 without the placeholder zeroes. While the placeholder is described here as being a zero, in other embodiments the placeholder can be any value that is constant, such as any other number, letter, or symbol that is consistently used.

In the exemplary system of FIG. 3, one protection packet is generated for the frame of four data packets. Thus the packet protection ratio is 1:4. Since one packet out of every five total packets is a protection packet, one would expect that 20% of the network bandwidth is used to transmit error correcting information. However, since the parity packet is generated to be the size of the largest data packet, there is 1500 bytes of error correcting information for 3600 bytes of data. Thus, 1500 bytes out of 5100 total bytes used in the network is for error correcting information, resulting in a 29% network overhead for error correcting information. Thus, a packet protection ratio on a packet basis is not equivalent to a network bandwidth usage based on bytes.

Further, when data and error correcting information is transmitted across communication network(s) 106, a link of the network may have a set capacity. For example, an MPLS link may have a 10 MB capacity and an Internet link may have a 10 MB capacity. In this example, transmitting data on the MPLS link and error correcting information on the Internet link in a 1:1 ratio, could mean the transmitter could send 10 mbps of data on the MPLS link and yet have 15 mbps of error correction packets on the Internet link, thus exceeding the capacity of the Internet link. Therefore, it is advantageous to send a specified number of bytes of error correcting information that is close to a target byte protection ratio, rather than sending a target number of data packets of error correcting information.

In an example embodiment of the present disclosure, a target byte protection ratio is selected or chosen, such as 1:4. This ratio means that for every four bytes of data, one byte of error correcting recovery information is transmitted, thus meaning 20% of network capacity is being used for network overhead, i.e. one byte out of every five bytes total is non-data. While embodiments of the present disclosure provide mechanisms for approaching a target network overhead percentage, the actual overhead percentage achieved may not be exactly the target percentage.

Figure 4A:
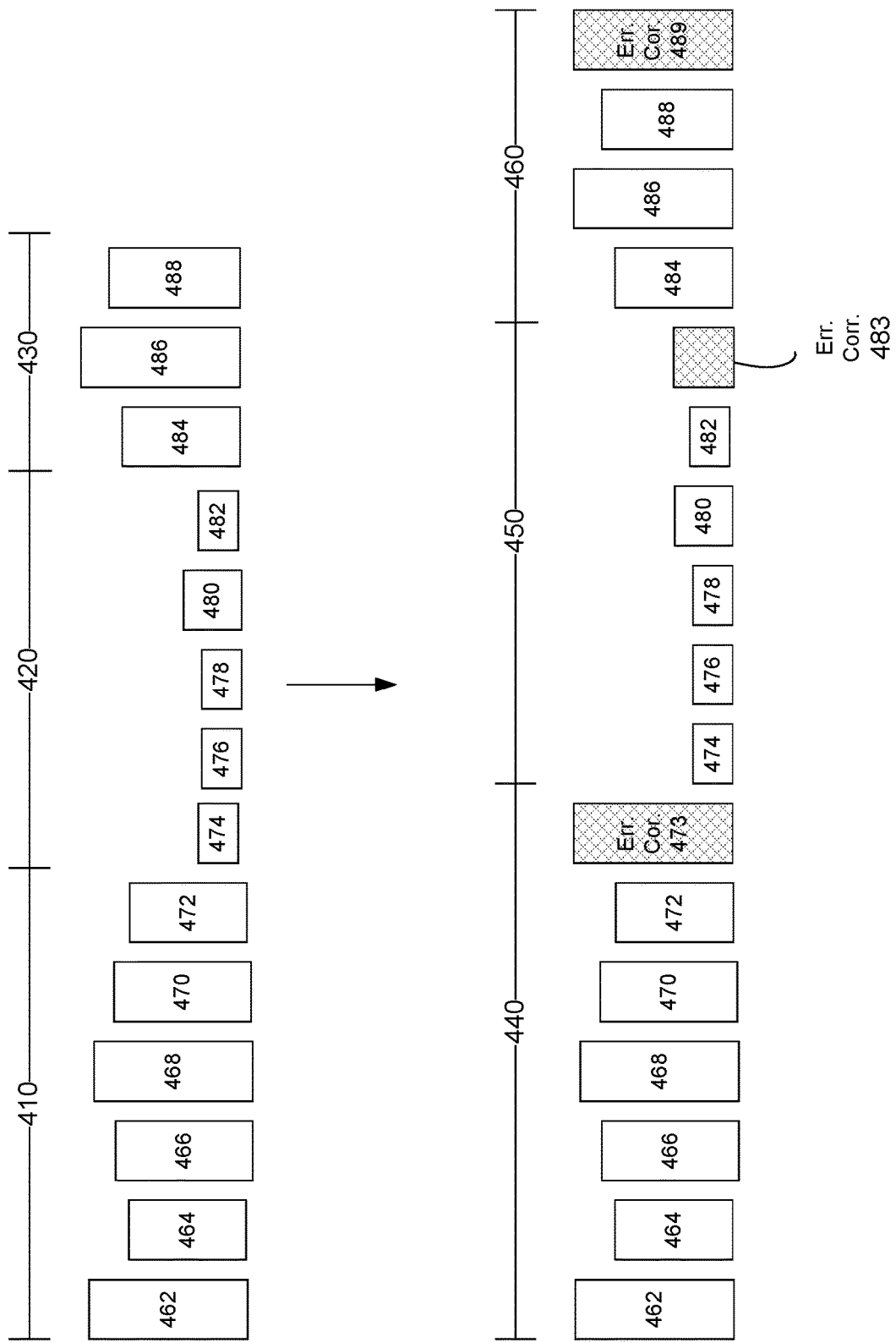
FIG. 4A depicts an exemplary embodiment of dynamic framing via grouping of data packets.

In the example embodiment depicted in FIG. 4A, the size of a frame is dynamically selected such that a frame begins and ends when a packet size changes significantly. Packets in a stream may be of varying sizes. When a next packet in the stream is much smaller or much larger than a maximum size of packets in the frame so far, a frame boundary may be inserted. For example, a data packet may be 1500 bytes, but an acknowledgement packet may be less than 100 bytes. Multiple sequences of data packets and acknowledgement packets may be present in a single data stream.

In the exemplary embodiment of FIG. 4A, data packets 462-488 have been arranged into three frames: frame 410 consists of six data packets, frame 420 consists of five data packets, and frame 430 consists of three data packets. Since the first packet of frame 420 is significantly smaller than the packets in frame 410, a frame boundary is placed there. Similarly, the first packet of frame 430 is significantly larger than the packets in frame 420, so a frame boundary is placed there. In this way, frames can be determined dynamically and be of different sizes for the same data stream.

The determination of the placement of frame boundary can be based on packet sizes that differ from previous packet sizes in the current frame by a certain amount or by a certain percentage. That is, if a next packet is within a certain size percentage of a previous packet in the frame, then it may be considered part of the same frame. For example, packets of sizes 1400 bytes, 1500 bytes, and 1300 bytes may all be considered part of the same frame, but a packet of 1100 bytes may be considered to be in a different frame. The amount that a next packet size should differ from previous packet sizes in order to be considered part of a new frame may be determined by the user, or may be a pre-set value, or may adjusted dynamically.

Error correction packets can be generated for each frame in accordance with the target byte protection ratio. Packets 462-488 have been grouped into frames 440, 450, and 460 in exemplary FIG. 4A with their respective error correction packets. Frame 440 of FIG. 4A consists of six data packets and a target packet protection ratio is 1:4. In order to approximately meet this ratio, either one or two error correction packets may be transmitted of the size of the biggest data packet within the frame (packet 462). In the example of FIG. 4A, one error correction packet 473 is generated for this frame, of the size of packet 462.

Frame 450 consists of five smaller data packets. To approximately meet the target packet protection ratio of 1:4, either one or two error correction packets may be transmitted of the size of the biggest data packet within the frame (packet 480). In the example of FIG. 4A, one error correction packet 483 is generated for this frame, of the size of packet 480. Frame 460 consists of three data packets. To approximately meet the target packet protection ratio of 1:4, one error correction packet 489 is generated of the same size as the largest data packet in the frame (packet 486).

The determination of whether one or two error correction packets should be generated can be based on a running tally (also called running average herein) of the amount of network overhead used for error correcting information, to keep the target network overhead at around 20% for each data stream or portion thereof. For example, frame 450 might have one error correction packet generated since the packets are larger, and frame 460 might have two error correction packets since the packets are of smaller size and use less network overhead. Thus, the size of error correcting information is tracked in a running tally such that an overall network overhead used for error correcting information for all frames in the stream is kept at approximately the target network overhead usage percentage of 20%.

Figure 4B:
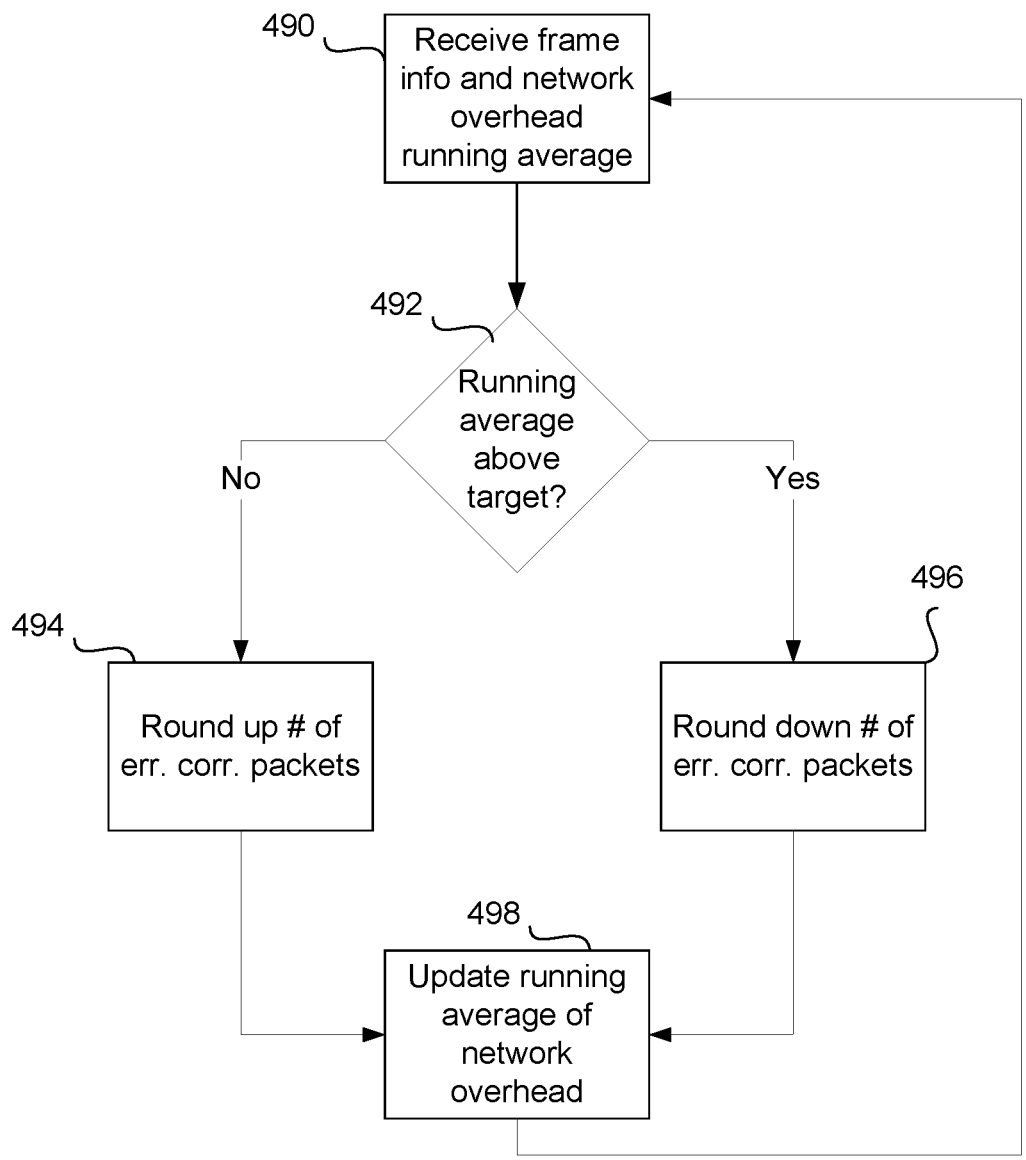
FIG. 4B depicts an exemplary flow sequence for a data protector to determine a number of error correction packets to generate for each frame.

FIG. 4B depicts an exemplary flow sequence for a data protector 112 to determine how many error correction packets to generate for each frame in a stream. In step 490, data protector 112 receives information regarding the frame, such as number of data packets, number of data bytes, and other relevant information such as the running average of network overhead usage thus far. The data protector 112 compares in step 492 the running average of the network overhead bytes used thus far for error correcting information with the target byte protection ratio.

If the network overhead usage is above the target byte protection ratio, then for the current frame being evaluated, data protector 112 may round down the number of protection packets generated, in step 496. If the network overhead usage is below the target byte protection ratio, then data protector 112 may round up the number of protection packets generated for the frame, in step 494.

For example, in frame 440, either one or two error correction packets can be generated to approximate the target byte protection ratio of 1:4. If data protector 112 determines that the running average of the network overhead used for the stream up to that point is above the target byte protection ratio, then one protection packet 473 is generated for the frame. If data protector 112 determines that the network overhead for the stream thus far is below the target byte protection ratio, then two protection packets can be generated for the frame. The running average of network overhead is then updated accordingly in step 498. In some embodiments the rounding functions may be designed to ensure that the ratio stays within maximum and/or minimum bounds.

By dynamically selecting frame boundaries to group packets of similar size, packet recovery information generated and transmitted across the communication network(s) is closer to the target packet protection ratio, and network bandwidth can be saved.

Figure 5A:
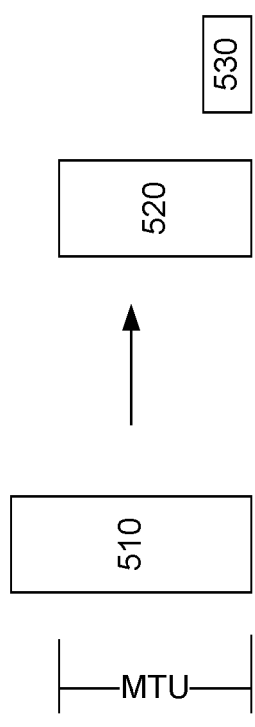
FIG. 5A depicts an exemplary embodiment of fragmenting data packets in prior systems.

In other systems, when a data packet is to be transmitted across a communication network that is larger than the maximum transmission unit (MTU), the packet is fragmented. For example, if a 1600 byte data packet is to be transmitted across a MTU with a capacity of 1500 bytes, then a 1500 byte packet is created and a second 100 byte packet is created, as depicted in FIG. 5A. Packet 510 is greater than the MTU, so packet 520 is generated that is of the same size as the MTU and packet 530 contains the remaining data. Note that depending on the fragmentation format, packet 530 may be slightly larger than 100 bytes due to fragmentation option overhead and/or rounding of fragmentation field values. We ignore this overhead here to simplify the explanation.

Due to the significant difference in data packet sizes of packet 520 and packet 530, having a sequence of individual large and small packets in series will cause every frame to be the size of one packet (if the previously described approach of starting a new frame when there is a significant change in the packet size). This would increase the actual error correcting ratio, effectively making it 1:1.

Figure 5B:
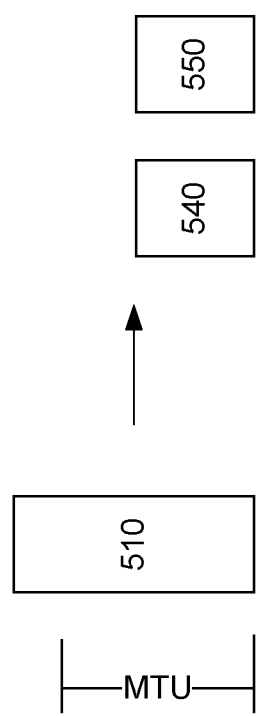
FIG. 5B depicts an exemplary embodiment of dynamic framing via fragmenting data packets.

Thus, in embodiments of the present disclosure, a large packet that is above the capacity of the MTU over which it is to be transmitted can be fragmented into equal parts (for a packet with an even number of bytes), as depicted in FIG. 5B. That is, packet 510 is greater than the MTU, so it is fragmented into packets 540 and 550 of equal parts. If packet 510 has an odd number of bytes, then it is fragmented into packets of substantially equal size parts (e.g. one fragmented packet may have one additional byte compared to the second fragmented packet). Since these packets are of the same size, they can be grouped into a single frame, thus facilitating the dynamic framing for the stream. While packets are depicted as being fragmented into two parts here, they can be fragmented into any number of substantially equal size portions (i.e. three, four, or more parts).

Figure 6:
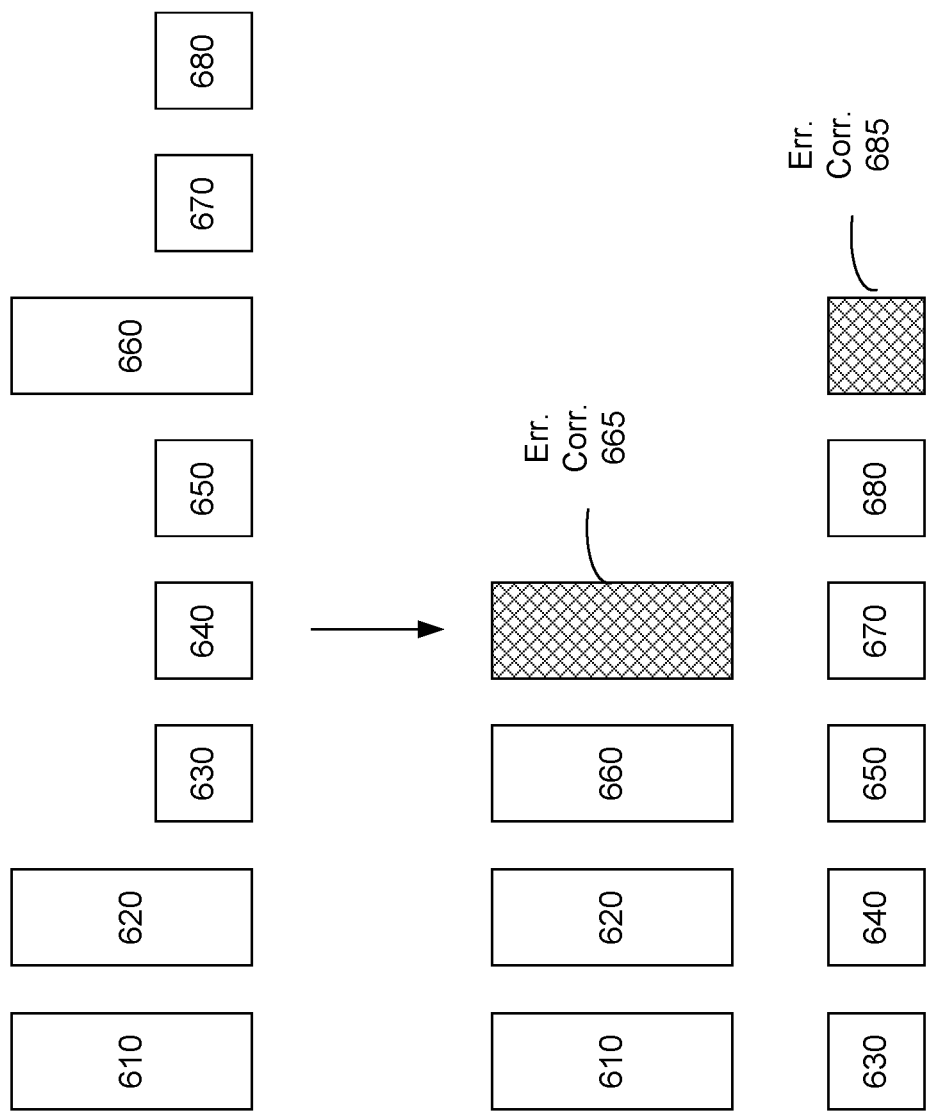
FIG. 6 depicts an exemplary embodiment of dynamic framing via interleaving data packets.

FIG. 6 depicts another exemplary embodiment of dynamic framing for approximating a target packet protection ratio. An exemplary stream of data packets 610-680 is presented in the figure. Using the process described above for placing frame boundaries in accordance with packet sizes, four frames would be generated from these eight data packets—a first frame consisting of packets 610 and 620, a second frame consisting of packets 630, 640, 650, a third frame consisting of packet 660, and a fourth frame consisting of packets 670 and 680. However, since an error correction packet is generated for each frame, this would result in four error correction packets and generating and transmitting error correcting information using more than the target 20% network resources.

In order to facilitate reaching the target of 20% network overhead usage, fewer error correction packets are needed by having fewer frames. Dynamic framing is used such that each frame consists of a larger number of packets. The packets from the stream can be placed out of order and each frame grouped according to packet size. Thus the stream can be broken into two frames—a first frame consisting of packet 610, 620 and 660, and a second frame consisting of packets 630, 640, 650, 670 and 680. Error correction packet 665 can be generated for the first frame, of the size of the largest data packet in the frame. Error correction packet 685 can be generated for the second frame, of the size of the largest data packet in that frame. Simply by reorganizing the frames in this way, the amount of error correcting information for the stream is significantly reduced, thus saving network bandwidth and achieving a network overhead usage percentage that is closer to the target byte protection ratio of 20%.

Figure 7:
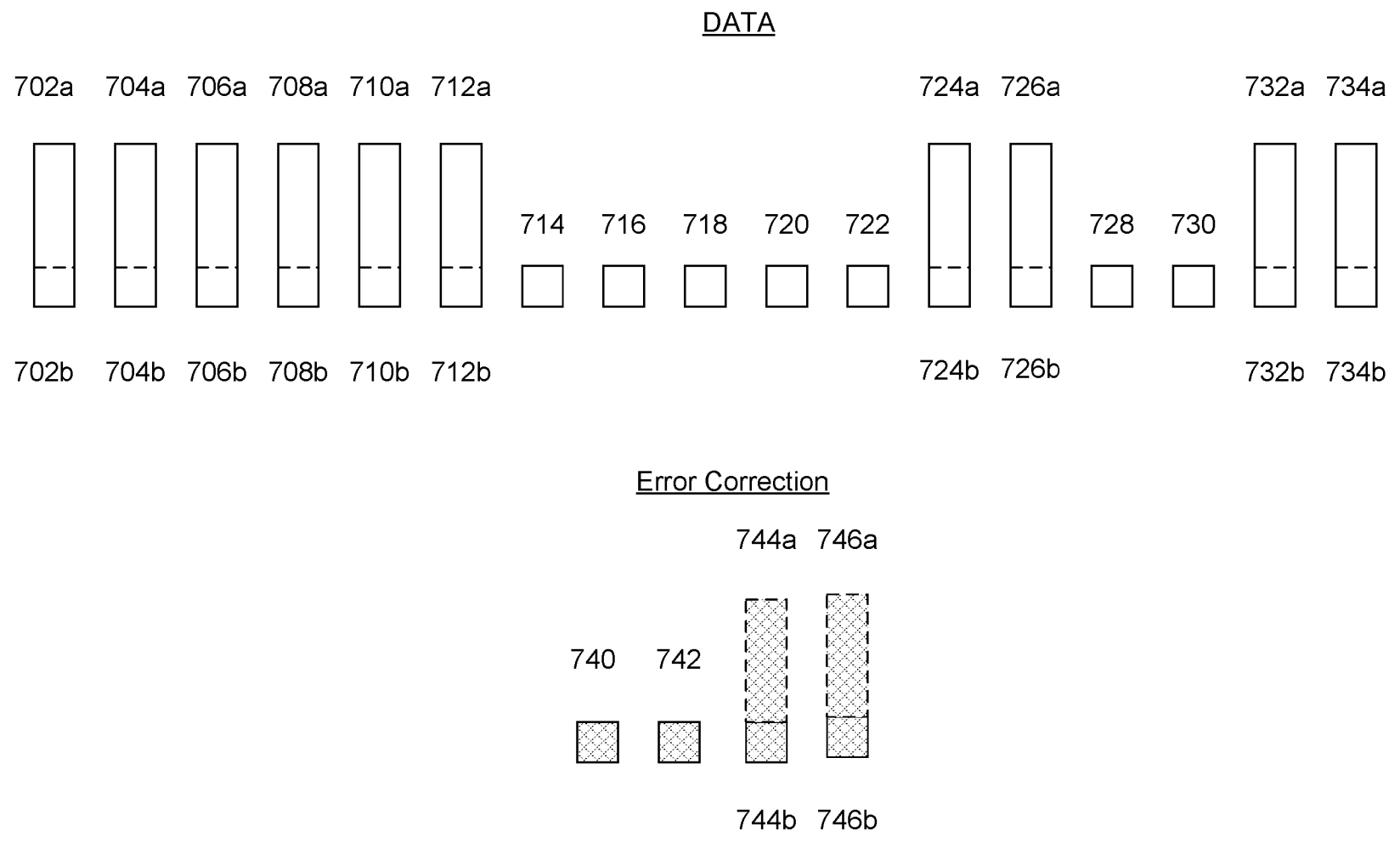

FIG. 7 depicts another exemplary embodiment of generating error correcting information based on target byte protection ratio. FIG. 7 depicts an exemplary sequence of data packets 702-734 to be transmitted from a stream. In an exemplary embodiment, a target packet protection ratio may be 1:5. There are seventeen data packets in the frame, of varying sizes. Each larger data packet may be segmented into two parts, with a smaller portion being an equivalent size to the smallest data packet in the frame. That is, packet 702 can be segmented into a portion 702a and 702b, with portion 702b being the same size as packet 714. The segmentation can be virtual, and not actually generate two separate packets, as would be understood by a person of ordinary skill in the art.

In placing frame boundaries for generating protection packets, all of the packets of the smaller size and the smaller portion of the larger packets can be considered a single frame, while the remaining larger portions of the larger data packets can be considered a second frame. That is, a first frame can be 702b-712b, 714-722, 724b-726b, 728-730, and 732b-734b. A second frame can be 702a-712a, 724a-726a and 732a-734a.

The first frame consists of seventeen total packets and packet portions. Using a target byte protection ratio of 1:5, four protection packets may be generated. These error correction packets contain information for the small data packets and a small portion of the larger data packets (the "b" portions). The four protection packets generated are depicted as 740, 742, 744b, and 746b.

For the second frame consisting of the remaining portions of the larger data packets (the "a" portions), error correcting information can be similarly generated. There are ten packet portions of larger data packets remaining, thus according to the target byte protection ratio of 1:5, two error correcting portions are generated of that size. Rather than generate and transmit two new error correction packets, the error correcting information for the second frame can be added to an existing smaller protection packet, as depicted in the figure by 744a and 746a. In this way, there are a total of 4 error correction packets for the stream of seventeen data packets (instead of six error correction packets), thus keeping close to the 1:5 overall target packet and byte protection ratios for the frame.

Figure 8:
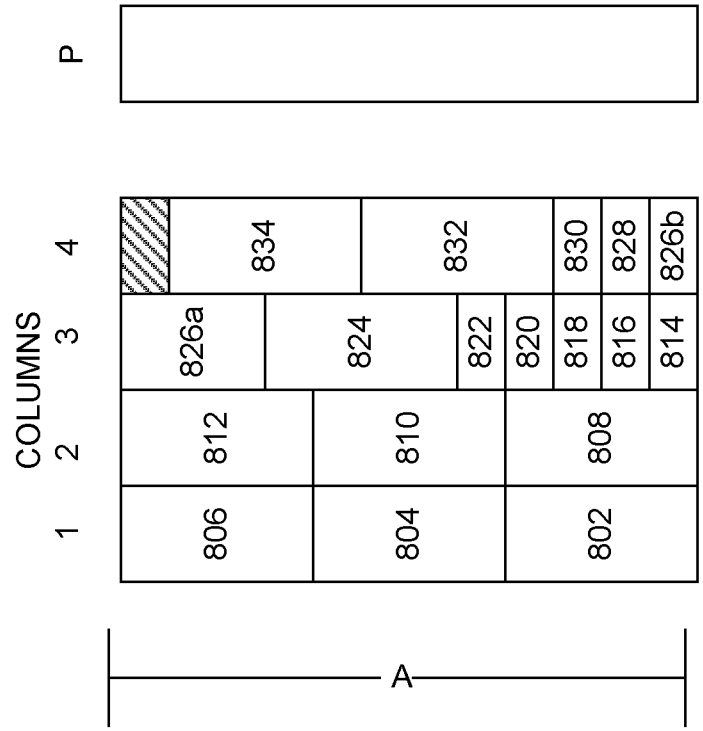
FIG. 8 depicts an exemplary embodiment of generating byte based error correction information for a plurality of data packets using a data structure.

In a further embodiment of the present disclosure, as data packets are received by the network appliance 202 for transmission, they are populated into a data structure in memory, which can be represented as a rectangle. A vertical size of the rectangular block of memory can be a byte size which is dynamic. A number of columns in the rectangular block can be based on the target packet protection ratio. Thus, for a 1:4 target byte protection ratio, a rectangular block can be generated of four columns for data, with the size of each column being variable such that all of the data fits within 4 columns only. A singular column of protection data is further generated with error correcting information for the columns. As discussed herein, protection data can use any error correcting code, such as Reed-Solomon coding and finite field arithmetic FIG. 8 depicts an exemplary stream of data packets 802-834 for transmission. As data packets are queued for transmission, they populate the rectangular block from bottom to top, left to right. A data packet can wrap around into multiple columns, as shown by packet 826a and 826b in columns 3 and 4. Each data packet's header can be amended with information regarding its placement within the rectangular block in memory, such that data packets can be placed in order by data corrector 118 or ordering sub-system 120, even if received out of order or lost in transmission. As would be understood by a person of ordinary skill in the art, data packets can be placed in a different manner, such as from top to bottom, right to left, or in any other manner. Similarly, while a rectangular grid structure is depicted here, other data structure formats can be used.

Once the data packets are placed in the grid, the grid is read in a horizontal manner, and protection information (also referred to herein as error correcting information or packet recovery information) is generated by the data protector 112 for each horizontal line of data. In this way, error correcting information is generated in a ratio of 1:4, which is the target byte protection ratio. Protection information is generated as a column "P", which can then be segmented into one or more data packets (P1-P3) for transmission across a communication network 106.

A receiving network appliance, such as network appliance B 104 of FIG. 1 can similarly populate a rectangular grid to determine missing or corrupt information, for repair with the protection packet(s). Once the stream has been received and the grid generated, the data corrector 118 of the receiving network appliance can read the rectangular block by each horizontal byte of data. If only one column of the four columns per each horizontal line has missing or corrupt information, the protection packet(s) can repair that information. However, if information is missing from more than one column of the rectangle for that horizontal line of bytes, then the protection packet will be unable to correct the information, since the protection ratio is 1:4 and there is only one portion of error correcting information for four portions of data. Thus, if more than one portion of data is missing or corrupt, it cannot be corrected.

In this embodiment, a vertical length, "A", for the rectangular block can be any number of bytes. For example, A might be 10,000 bytes. When scanning the block to repair the data, the receiving network appliance runs 10,000 error correcting calculations (one for each horizontal byte line of data). When there are large amounts of data to be transmitted, A can be set to be a large value. When there are small amounts of data to be transmitted, A can be set to a small value. Similarly the number of columns can be changed dynamically based on the target byte protection ratio.

Figure 9A:
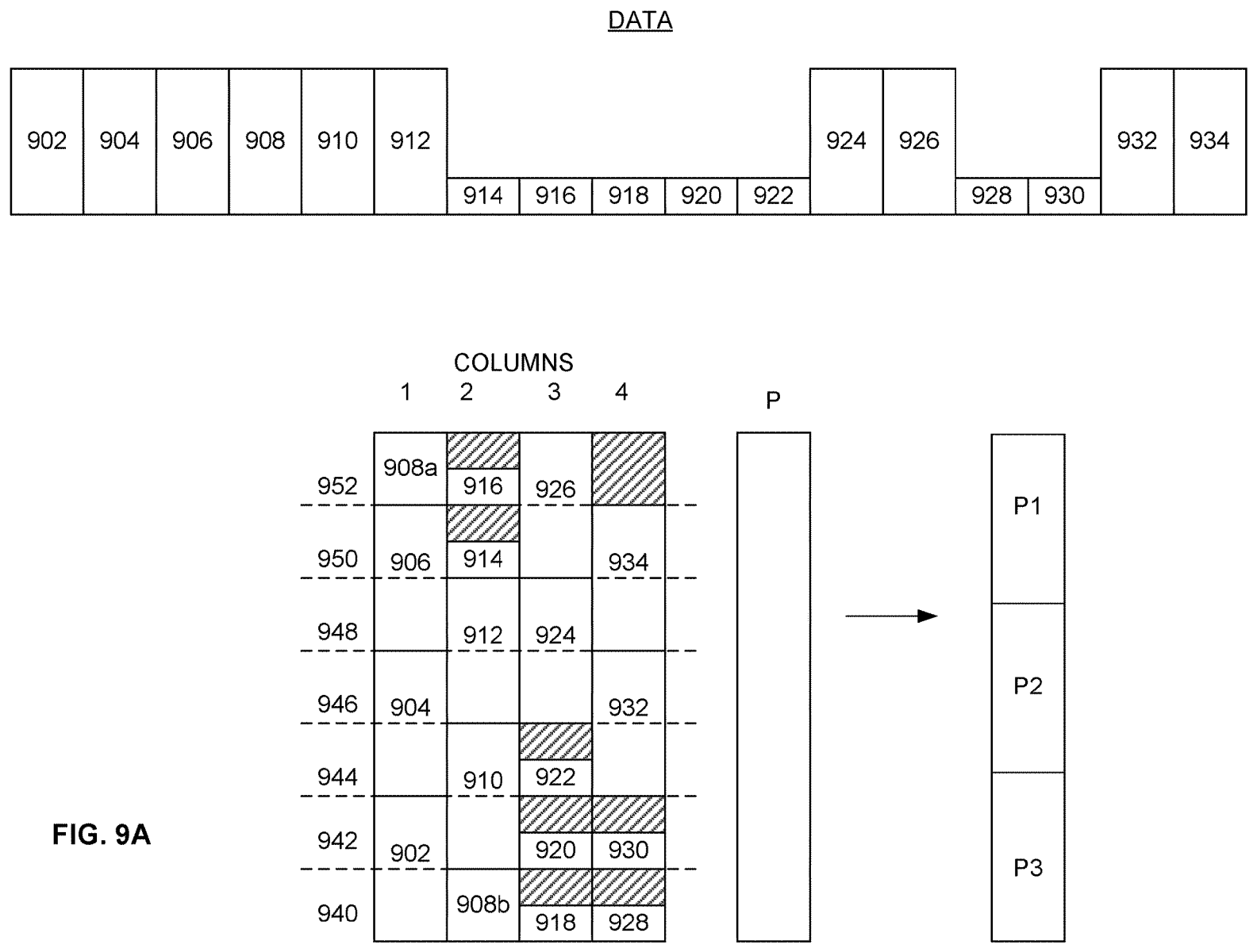

FIG. 9A depicts a further embodiment of the present disclosure for generating error correcting information in accordance with a target byte protection ratio. As data packets are received by the network appliance 202 for transmission, they are populated into a data structure in memory, which can be represented as a rectangle. A vertical size of the rectangular block of memory can be a byte size which is dynamic. A number of columns in the rectangular block can be based on the target packet protection ratio. Thus, for a 1:4 target byte protection ratio, a rectangular block can be generated of 4 columns for data, with the size of each column being variable such that all of the data fits within 4 columns only. A singular column of protection data is further generated with error correcting information for the columns. As discussed herein, protection data can use any error correcting code, such as Reed-Solomon coding and finite field arithmetic.

FIG. 9A depicts an exemplary stream of data packets 902-934 for transmission. As data packets are queued for transmission, they populate a grid with defined rows 940-952. Since the target byte protection ratio is 1:4, the grid has four columns. The columns can be of any length to accommodate the data. That is, the columns can have as many rows as necessary to accommodate the data, and each row can be of an accommodating size.

In an exemplary embodiment, the grid is populated from bottom to top, left to right, with each data packet beginning at a boundary of a row. Data packet 902 is placed in the grid starting from a boundary of row 940. The packet is of a size that it completely covers rows 940 and 942. The next packet, packet 904, is placed in the grid beginning at the next row boundary, which is row 944. Packet 904 is also of a size that it completely covers rows 944 and 946. Packets are placed in the grid in this manner. Packet 908 is placed in the grid beginning at the boundary of row 952, but wraps around to column 2 to fully accommodate all of the data, represented as 908a and 908b in exemplary FIG. 9.

If packets are of uneven length, there may be unfilled space in the rectangle between the end of a prior packet and the beginning of a subsequent packet. For example, packet 914 is placed in the grid at the beginning of the boundary of row 950. The packet is of a smaller size though and does not take up the whole space of row 950. Thus, there is some unfilled space in the grid because packet 916 is placed in the grid starting at the beginning of the next row boundary, which is row 952. Unfilled spaces in the grid are assigned a predetermined value, typically zero. All of the data packets 902-934 continue to be placed in the grid in this manner.

Each data packet's header can be amended with information regarding its placement within the rectangular block in memory, such that data packets can be placed in order by data corrector 118 or ordering sub-system 120, even if received out of order or lost in transmission.

As would be understood by a person of ordinary skill in the art, data packets can be placed in a different manner, such as from top to bottom, right to left, or in any other manner. Similarly, while a rectangular grid structure is depicted here, other data structure formats can be used.

Once the data packets are placed in the grid, the grid is read in a horizontal manner, and protection information is generated by the data protector 112 for each row of data. In this way, error correcting information is generated in a ratio of 1:4, which is the target byte protection ratio. Protection information is generated as a column "P", which can then be segmented into one or more data packets (P1-P3) for transmission across a communication network 106.

A receiving network appliance can similarly populate a rectangular grid to determine missing or corrupt information, for repair with the protection packet(s). Once the stream has been received and the grid generated, the data corrector 118 of the receiving network appliance can read the rectangular block by each row of data. If only one column of the four columns per row has missing or corrupt information, the protection packet(s) can repair that information. However, if information is missing from more than one column of the rectangle for that row, then the protection packet will be unable to correct the information, since the protection ratio is 1:4 and there is only one portion of error correcting information for four portions of data. Thus, if more than one portion of data is missing or corrupt, it cannot be corrected.

For example, row 940 contains data from packets 902, 908, 918 and 928. If only one of these packets is missing or corrupt, then protection packet P3 can correct it. However, if more than one of these packets is missing or corrupt, then the protection packet P3 will not be able to correct the data in the row. Similarly, row 952 has data from packets 908, 916 and 926. If only one of these packets is missing or corrupt, then protection packet P1 can correct it. However, if more than one of these packets is missing or corrupt, then the protection packet will not be able to correct the data in the row.

In this embodiment, a vertical length, "A", for the rectangular block can be any number of rows. In the exemplary embodiment of FIG. 9A, seven rows are depicted. The rows may comprise any number of bytes, such as 10,000 bytes. When scanning the block to repair the data, the receiving network appliance scans each row and thus runs seven error correcting calculations (one for each row of data). In this way, instead of running 10,000 error correcting calculations, one for each horizontal byte row of data, error correcting calculations are run for each row of data, which is a smaller value by orders of magnitude. When there are large amounts of data to be transmitted, A can be set to be a large value. When there are small amounts of data to be transmitted, A can be set to a small value.

Figure 9B:
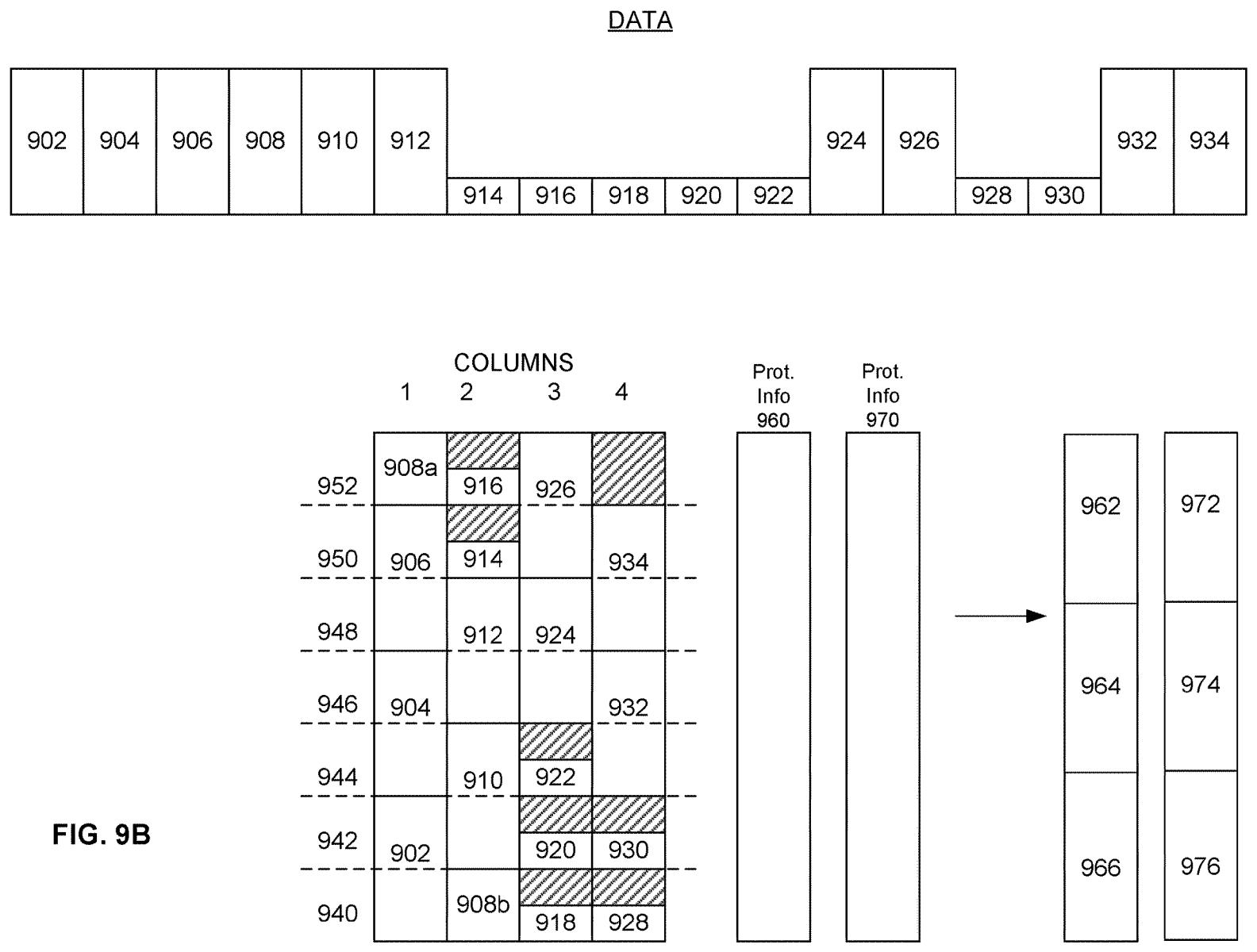

FIG. 9B depicts a further embodiment of the present disclosure for generating error correcting information in accordance with a target byte protection ratio. As data packets are received by the network appliance 202 for transmission, they are populated into a data structure in memory, which can be represented as a rectangle. A vertical size of the rectangular block of memory can be a byte size which is dynamic. A number of columns in the rectangular block can be based on the target packet protection ratio. Thus, for a 2:4 target byte protection ratio, a rectangular block can be generated of 4 columns for data, with the size of each column being variable such that all of the data fits within 4 columns only. Two columns of protection data are further generated with error correcting information for the columns. As discussed herein, protection data can use any error correcting code, such as Reed-Solomon coding and finite field arithmetic.

FIG. 9B depicts an exemplary stream of data packets 902-934 for transmission. As data packets are queued for transmission, they populate a grid with defined rows 940-952. Since the target packet protection ratio is 2:4, the grid has 4 columns. The columns can be of any length to accommodate the data. That is, the columns can have as many rows as necessary to accommodate the data, and each row can be of an accommodating size.

In an exemplary embodiment, the grid is populated as discussed above with respect to FIG. 9A. Once the data packets are placed in the grid, the grid is read in a horizontal manner, and protection information is generated by the data protector 112 for each row of data. In this way, error correcting information is generated in a ratio of 2:4, which is the target packet protection ratio. Protection information is generated as columns 960 and 970. Each column can be segmented into one or more data protection packets, for example column 960 can be segmented into protection packets 962, 964 and 966. Column 970 can be segmented into protection packets 972, 974 and 976 for transmission across a communication network 106.

A receiving network appliance can similarly populate a rectangular grid to determine missing or corrupt information, for repair with the protection packet(s) as discussed above with respect to FIG. 9A. Once the stream has been received and the grid generated, the data corrector 118 of the receiving network appliance can read the rectangular block by each row of data. If two or fewer columns of the four columns per row have missing or corrupt information, the protection packet(s) can repair that information. However, if information is missing from more than two columns of the rectangle for that row, then the protection packets will be unable to correct the information, since there are two portions of error correcting information for four portions of data. Thus, if more than two portions of data are missing or corrupt, the affected packets cannot be reconstructed.

For example, row 940 contains data from packets 902, 908, 918 and 928. If only one of these packets is missing or corrupt, then protection packet 966 or 976 can correct it. However, if more than two of these packets is missing or corrupt, then the protection packets 966 and 976 will not be able to correct the data in the row. Similarly, row 952 has data from packets 908, 916 and 926. If only one of these packets is missing or corrupt, then protection packet 962 or 972 can correct it. However, if more than two of these packets is missing or corrupt, then the protection packets will not be able to correct the data in the row.

In this embodiment, a vertical length, "A", for the rectangular block can be any number of rows. In the exemplary embodiment of FIG. 9B, 7 rows are depicted. The rows may comprise any number of bytes, such as 10,000 bytes. When scanning the block to repair the data, the receiving network appliance scans each row and thus runs seven error correcting calculations (one for each row of data). In this way, instead of running 10,000 error correcting calculations, one for each horizontal byte row of data, error correcting calculations are run for each row of data, which is a smaller value by orders of magnitude. When there are large amounts of data to be transmitted, A can be set to be a large value. When there are small amounts of data to be transmitted, A can be set to a small value. Similarly the number of data columns and the number of protection columns can be varied dynamically as the target byte ratio changes.

Thus, methods and systems for forward packet recovery with constrained overhead are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A computer-implemented method for providing corrected data packets to a second processor, the method comprising:
   receiving at a first processor, a data stream comprising a plurality of data packets for transmission across at least one communication network, the plurality of data packets being of various sizes;
   selecting a target byte protection ratio for the data stream, the target byte protection ratio representing a target number of bytes of error correcting information per bytes of data in the data stream;
   categorizing the plurality of data packets in the data stream into a plurality of categories according to size, the categories comprising data packets of a first size range and data packets of a second size range, wherein the second size range is larger than the first size range;
   generating one or more error correcting frames for each category of the plurality of categories, such that each error correcting frame comprises data packets of a comparable size;
   generating one or more error correction data packets for each error correcting frame, in accordance with the target byte protection ratio; and
   transmitting the plurality of data packets and the one or more error correction data packets across the at least one communication network to the second processor.

2. The method of claim 1, wherein the target byte protection ratio for the data stream is selected to correspond to a target network bandwidth usage for the error correcting information.

3. The method of claim 1, wherein the one or more error correcting frames are further generated in accordance with a timeout policy, such that all packets received within a certain period of time are determined to be within the one or more error correcting frames.

4. The method of claim 1, wherein the generating one or more error correcting frames for each category further comprises generating one or more error correcting frames of information for corresponding data packets, such that the error correcting information for the data stream is in a different order than the data packets of the data stream.

5. The method of claim 1, wherein the transmitting the plurality of data packets comprises transmitting the data packets from the data stream in order of receipt, and the transmitting the one or more error correction data packets comprises transmitting error correcting information out of order from an order of corresponding data packets in the data stream.

6. The method of claim 1, wherein the generating one or more error correction data packets in accordance with the target byte protection ratio further comprises:
   keeping a running tally of a number of error correction data packets generated for all error correcting frames in the data stream; and
   adjusting an amount of the error correction data packets generated for each subsequent frame based on the running tally of error correction data packets for the data stream, in accordance with the target byte protection ratio for the data stream.

7. The method of claim 1, wherein the receiving the plurality of data packets for transmission across the at least one communication network further comprises:
   comparing a size of each data packet to a maximum transmission unit capacity of the at least one communication network; and
   fragmenting each data packet above the capacity of the maximum transmission unit for the at least one communication network into two or more portions of substantially equal size.

8. The method of claim 1, wherein the generating one or more error correcting frames for the data stream further comprises:
   segmenting the data packets of the second size range into a first portion equivalent in size to at least one of the data packets of the first size range and a second portion comprising a remainder of the data packets of the second size range;
   generating at least one error correcting frame for the data packets of the first size range and the first portion of the data packets of the second size range; and
   generating at least one error correcting frame for the second portion of the data packets of the second size range.

9. The method of claim 1, wherein at least one of the plurality of data packets is received out of order at the second processor.

10. The method of claim 1, wherein the error correcting information in at least one error correction data packet is generated using Reed-Solomon coding.

11. The method of claim 1, further comprising regenerating the data stream at the second processor by:
receiving the plurality of data packets and the one or more error correction data packets from the first processor; and
utilizing information in the received plurality of data packets and the received one or more error correction data packets to regenerate the data stream by correcting at least one lost, corrupt, or out of order data packet in the data stream.

12. The method of claim 1, further comprising regenerating the data stream at the second processor by:
receiving the plurality of data packets and the one or more error correction data packets from the first processor; and
utilizing a sequence number in a header of the received plurality of data packets and the received one or more error correction data packets to regenerate the data stream by correcting at least one lost, corrupt, or out of order data packet in the data stream.

13. A computer-implemented method for regenerating a data stream received at a second processor from a first processor across at least one communication network; the method comprising:
receiving a plurality of data packets and one or more error correction data packets from the first processor; wherein the one or more error correction data packets are generated by the first processor in accordance with a target byte protection ratio for the data stream, the target byte protection ratio representing a target number of bytes of error correcting information per bytes of data in the data stream; and
utilizing the received plurality of data packets and the received one or more error correction data packets to regenerate the data stream by correcting at least one lost, corrupt, or out of order data packet in the data stream.

14. The method of claim 13, wherein the one or more error correction data packets are generated from one or more generated error correcting frames, each of the one or more generated error correcting frame comprising data packets of a comparable size.

15. The method of claim 13, wherein the one or more error correction data packets are generated by the first processor with error correcting information for the data stream that is in a different order than the data packets of the data stream.

16. The method of claim 13, wherein the target byte protection ratio for the data stream is selected to correspond to a target network bandwidth usage for the error correcting information.

17. A computing system for providing corrected data packets to a second network appliance, the system comprising:
a first network appliance in communication with a second network appliance via at least one communication network, the first network appliance comprising at least one processor configured to:
receive a data stream comprising a plurality of data packets for transmission across the at least one communication network to the second network appliance;
select a target byte protection ratio for the data stream, the target byte protection ratio representing a target number of bytes of error correcting information per bytes of data in the data stream;
categorize the plurality of data packets in the data stream according to size, the categories comprising a first category of data packets within a first size range and a second category of data packets within a second size range;
generate one or more error correcting frames for each category, such that each error correcting frame comprises data packets of a comparable size;
generate one or more error correction data packets for each generated error correcting frame, in accordance with the target byte protection ratio; and
transmit the plurality of data packets and the one or more error correction data packets across the at least one communication network to the second network appliance.

18. The system of claim 17, wherein the second network appliance comprises at least one processor configured to:
receive the plurality of data packets and the one or more error correction data packets from the first network appliance; and
utilize the received plurality of data packets and the received one or more error correction data packets to regenerate the data stream in order by correcting at least one lost, corrupt, or out of order data packet in the data stream.

19. The system of claim 17, wherein the target byte protection ratio for the data stream is selected to correspond to a target network bandwidth usage for the error correcting information.

20. The system of claim 17, wherein the generating one or more error correcting frames for each category further comprises generating one or more error correcting frames of information for corresponding data packets, such that the error correcting information for the data stream is in a different order than the data packets of the data stream.

* * * * *